United States Patent
Iinami et al.

(10) Patent No.: US 11,653,210 B2
(45) Date of Patent: May 16, 2023

(54) VEHICLE COMMUNICATION PROCESSOR, VEHICLE COMMUNICATION CONTROL METHOD AND VEHICLE

(71) Applicant: SUBARU CORPORATION, Tokyo (JP)

(72) Inventors: Hisataro Iinami, Tokyo (JP); Ayaka Ohki, Tokyo (JP); Masaaki Harada, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 68 days.

(21) Appl. No.: 17/375,718

(22) Filed: Jul. 14, 2021

(65) Prior Publication Data

US 2022/0038905 A1  Feb. 3, 2022

(30) Foreign Application Priority Data

Jul. 28, 2020 (JP) .............................. JP2020-127171

(51) Int. Cl.
*H04W 12/122* (2021.01)
*H04W 12/06* (2021.01)

(52) U.S. Cl.
CPC ......... *H04W 12/122* (2021.01); *H04W 12/06* (2013.01)

(58) Field of Classification Search
CPC ........................... H04W 12/122; H04W 12/06
See application file for complete search history.

(56) References Cited

U.S. PATENT DOCUMENTS

| 7,356,832 B1 * | 4/2008 | Eibach | B60R 25/00 |
| | | | 701/32.7 |
| 2003/0009271 A1 * | 1/2003 | Akiyama | H04L 69/329 |
| | | | 701/29.6 |

(Continued)

FOREIGN PATENT DOCUMENTS

JP  2019-009788 A  1/2019

OTHER PUBLICATIONS

Hafeez et al., "ECU Fingerprinting through Parametric Signal Modeling and Artificial Neural Networks for In-vehicle Security against Spoofing Attacks", Dec. 2019, 15th International Computer Engineering Conference, pp. 29-38 (Year: 2019).*

*Primary Examiner* — Kenneth W Chang
(74) *Attorney, Agent, or Firm* — McDermott Will & Emery LLP (57) ABSTRACT

A vehicle communication processor includes a communication control unit that receives digitally signed information from an external device, and a first control processing unit and a second control processing unit that process information received by the communication control unit. The communication control unit or the first control processing unit includes a sign verification section that performs an authenticity verification of a digital sign of the digitally signed information. The second control processing unit includes an execution preparation section and an execution determination section. The execution preparation section performs an execution preparation process on data of the digitally signed information in parallel to the authenticity verification on the digital sign. The execution determination section determines whether the data of the digitally signed information is to be executed in a case where the digital sign of the digitally signed information is verified as being authentic.

10 Claims, 7 Drawing Sheets

(56) References Cited

U.S. PATENT DOCUMENTS

| | | | | |
|---|---|---|---|---|
| 2008/0008253 A1* | 1/2008 | Sugiura | ............... | H04L 7/0066 |
| | | | | 375/243 |
| 2011/0080302 A1* | 4/2011 | Muthaiah | ............ | H04W 12/069 |
| | | | | 340/903 |
| 2013/0268754 A1* | 10/2013 | Baltes | ................. | H04L 9/3247 |
| | | | | 713/155 |
| 2014/0032916 A1* | 1/2014 | Costin | ................. | H04L 9/3247 |
| | | | | 713/176 |
| 2014/0058532 A1* | 2/2014 | Das | ................. | G05B 19/0426 |
| | | | | 700/1 |
| 2014/0058579 A1* | 2/2014 | Ono | ....................... | G06F 17/00 |
| | | | | 701/1 |
| 2017/0111177 A1* | 4/2017 | Oguma | ................ | H04L 9/3273 |

* cited by examiner

VEHICLE COMMUNICATION PROCESSOR, VEHICLE COMMUNICATION CONTROL METHOD AND VEHICLE

CROSS-REFERENCE TO RELATED APPLICATIONS

The present application claims priority from Japanese Patent Application Nos. 2020-127171 filed on Jul. 28, 2020 the entire contents of which are hereby incorporated by reference.

BACKGROUND

The technology relates to a vehicle communication processor, a vehicle communication control method, and a vehicle including the vehicle communication processor.

A vehicle communication system, such as a vehicle-to-vehicle (V2V) communication system or a vehicle-to-everything (V2X) communication system, shares position data or speed data and other various pieces of information with other vehicles and infrastructures to achieve comfortable automated driving without an accident.

It is desired to ensure information security when vehicle exterior information is utilized in the vehicle communication. Information transmitted from external devices to an electronic control unit (ECU) mounted in a vehicle can include fake information, false information, or spoofed information transmitted from a spoofed source that inversely affects traveling of the vehicle. Using a digital sign is effective to remove these pieces of malicious information and ensure the information security. For example, Japanese Unexamined Patent Application Publication (JP-A) No. 2019-9788 discloses an in-vehicle ECU including a receiver and a determination unit. The receiver receives digitally signed information, and the determination unit verifies the authenticity of the digital sign.

SUMMARY

An aspect of the technology provides a vehicle communication processor including a communication control unit and a first control processing unit and a second control processing unit. The communication control unit is configured to receive digitally signed information from an external device. The digitally signed information includes data and a digital sign. The first control processing unit and the second control processing unit are configured to process information received by the communication control unit. The communication control unit or the first control processing unit includes a sign verification section configured to perform an authenticity verification on the digital sign included in the digitally signed information received by the communication control unit.

The second control processing unit includes an execution preparation section and an execution determination section. The execution preparation section is configured to perform an execution preparation process on the data included in the digitally signed information in parallel to the authenticity verification performed by the sign verification section on the digital sign included in the digitally signed information. The execution determination section is configured to determine whether the data included in the digitally signed information is to be executed in a case where the digital sign included in the digitally signed information is verified as being authentic by the sign verification section.

An aspect of the technology provides a vehicle that includes a vehicle communication processor including a communication control unit and a first control processing unit and a second control processing unit. The communication control unit is configured to receive digitally signed information from an external device. The digitally signed information includes data and a digital sign. The first control processing unit and the second control processing unit are configured to process information received by the communication control unit. The communication control unit or the first control processing unit includes a sign verification section configured to perform an authenticity verification on the digital sign included in the digitally signed information received by the communication control unit. The second control processing unit includes an execution preparation section and an execution determination section. The execution preparation section is configured to perform an execution preparation process on the data included in the digitally signed information in parallel to the authenticity verification performed by the sign verification section on the digital sign included in the digitally signed information. The execution determination section is configured to determine whether the data included in the digitally signed information is to be executed in a case where the digital sign included in the digitally signed information is verified as being authentic by the sign verification section.

An aspect of the technology provides a vehicle communication control method. The method includes: performing an authenticity verification on a digital sign included in digitally signed information received from an external device; performing an execution preparation process on data included in the digitally signed information in parallel to the authenticity verification on the digital sign included in the digitally signed information; and determining whether the data included in the digitally signed information is to be executed in a case where the digital sign included in the digitally signed information is verified as being authentic.

An aspect of the technology provides a vehicle communication processor including first circuitry and second circuitry. The first circuitry is configured to receive digitally signed information from an external device. The digitally signed information includes data and a digital sign. The second circuitry is configured to process information received by the first circuitry. One of the first circuitry and the second circuitry is configured to perform an authenticity verification on the digital sign included in the digitally signed information received by the first circuitry. The second circuitry is configured to: perform an execution preparation process on the data included in the digitally signed information in parallel to the authenticity verification on the digital sign included in the digitally signed information; and determine whether the data included in the digitally signed information is to be executed in a case where the digital sign included in the digitally signed information is verified as being authentic.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

When receiving digitally signed information, an in-vehicle ECU disclosed in JP-A No. 2019-9788 verifies the authenticity of the digital sign included in the digitally signed information. If the digital sign is verified as being authentic, the in-vehicle ECU processes an application data in the digitally signed information.

Such an in-vehicle ECU verifies the authenticity of the digital sign each time the digitally signed information is received. The authenticity verification of the digital sign involves a number of calculations. Thus, it takes a certain processing time from the reception of the digitally signed information via the authenticity verification of the digital sign to the start of the processing on the application data.

Meanwhile, many in-vehicle ECUs have a capacity limited by the need to be resistant to severe usage conditions, such as harsh temperature and vibrations, and their limited power resource. Thus, when a large number of pieces of digitally signed information are received by the in-vehicle ECU via a V2X communication, for example, the load of the authenticity verifications of the digital signs can become larger than the capacity of the in-vehicle ECU. This can generate a relatively large delay time between reception of the digitally signed information and reflection of the data in the digitally signed information on the control.

Vehicle control needs information communication with little delay for safety. A delay time generated in information communication can cause the vehicle to fail to respond to received information because the vehicle moves in the delay time. Thus, in a case where a delay time is generated in the V2X communication, only information about locations some distance from the vehicle can be utilized. This hinders effective use of the information about locations near the vehicle.

It is desirable to provide a vehicle communication processor and a vehicle communication control method that make it possible to ensure the security of the vehicle communication control.

Some example embodiment of the technology will now be described with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
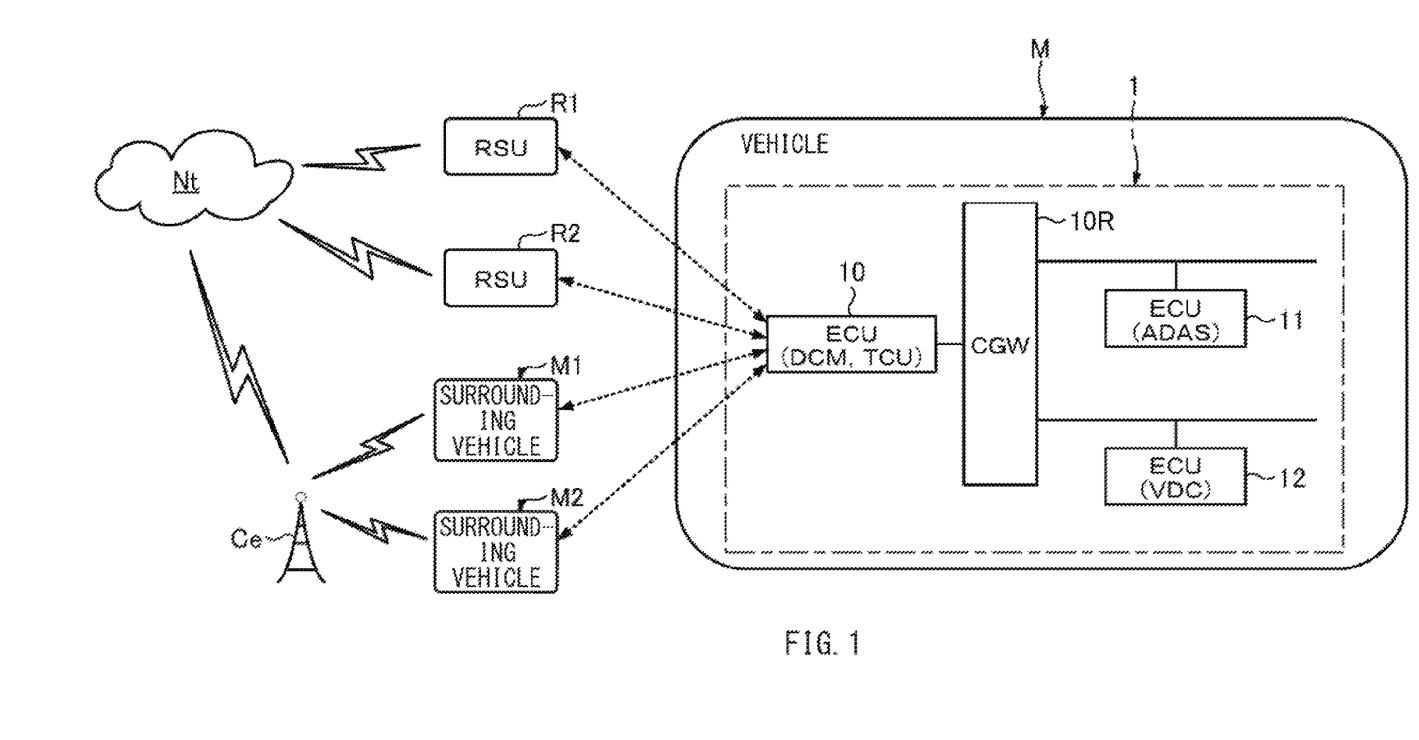
FIG. 1 is a block diagram illustrating an exemplary communication state of a vehicle including a vehicle communication processor according to one example embodiment of the technology.

With reference to FIG. 1, a vehicle M includes a vehicle communication processor 1. The vehicle communication processor 1 may include a plurality of ECUs. The ECUs may be coupled to each other via a communication network such as a controller area network (CAN).

One of the ECUs in the vehicle communication processor 1 may be a communication control unit 10. The communication control unit 10 may be an ECU with a communication function, such as a data communication module (DCM) or a telematics communication unit (TCU). The communication control unit 10 may receive digitally signed information from an external device outside the vehicle.

The other ECUs in the vehicle communication processor 1 may be control processing units 11 and 12. The control processing units 11 and 12 may be coupled to the communication control unit 10 to process information received by the communication control unit 10 in parallel to a process performed by the communication control unit 10. The control processing unit 11 may be an advanced driver-assistance system (ADAS) that assists traveling of the vehicle M, for example. The control processing unit 12 may be an ECU that executes travel control such as vehicle dynamics control (VDC).

The control processing units 11 and 12 are non-limiting examples of the ECUs coupled to the communication control unit 10. For example, ECUs that executes other control, such as a chassis ECU, a body ECU, or a multimedia ECU may be coupled to the communication control unit 10 in place of or in addition to the control processing units 11 and 12. In the example illustrated in FIG. 1, the ECUs may be coupled in parallel to the communication control unit 10 via a gateway 10R, which may be a central gateway (CGW), for example. The communication control unit 10 and the gateway 10R may constitute a single unit (CGW-ECU).

The communication control unit 10 may establish the V2X communication to communicate with surrounding vehicles M1 and M2 and roadside units (RSUs) R1 and R2 that are present around the vehicle M. The surrounding vehicles M1 and M2 and the roadside units R1 and R2 may communicate with a cloud server Nt and a base station Ce. In the V2X communication, the communication control unit 10 of the vehicle communication processor 1 mounted on the vehicle M may receive digitally signed information from the cloud server Nt via various communication networks.

Some exemplary processes (processing programs) performed by the communication control unit 10 and the control processing units 11 and 12 will now be described with reference to FIG. 2. In the example illustrated in FIG. 2, the communication control unit 10 may include an information receiving section P1, a data transferring section P2, and a sign verification section P3. The information receiving section P1 may receive digitally signed information including data and a digital sign. The data transferring section P2 may transfer part or the entirety of the digitally signed information to the other ECUs. The sign verification section P3 may perform an authenticity verification to verify the authenticity of the digital sign of the digitally signed information received.

Figure 2:
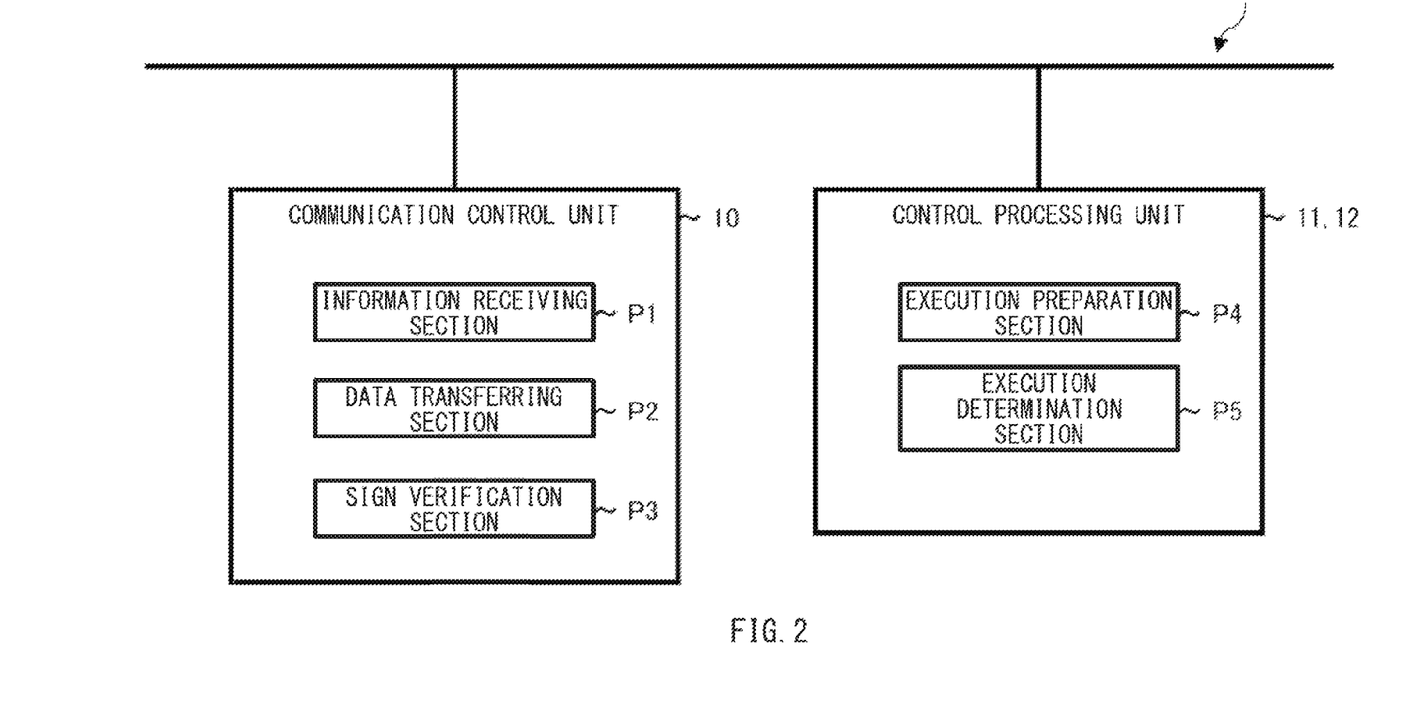
FIG. 2 is a block diagram illustrating an exemplary configuration of the vehicle communication processor.

In the example illustrated in FIG. 2, the control processing unit 11 or 12 may include an execution preparation section P4 and an execution determination section P5. The execution preparation section P4 may perform an execution preparation process on the data transferred from the data transferring section P2. The execution determination section P5 may determine if the data subjected to the execution preparation process by the execution preparation section P4 is to be executed.

In the present example embodiment, the execution preparation process may be a computing process performed by the execution preparation section P4 to reflect the data transferred from the data transferring section P2 on the control. The execution preparation process may be conducted on the data of the digitally signed information in parallel to the authenticity verification performed by the sign verification section P3 in the communication control unit 10 to verify the authenticity of the digital sign of the digitally signed information. The result of the process performed by the execution preparation section P4 may not be reflected on the control before the determination is made by the execution determination section P5.

The execution determination section P5 may receive the result of the authenticity verification performed by the sign verification section P3 of the communication control unit 10. The execution determination section P5 may determine that the control on which the result of the process performed by the execution preparation section P4 is reflected is to be executed in a case where the digital sign of the digitally signed information is verified as being authentic by the sign verification section P3 and where the execution preparation section P4 finishes processing the data of the digitally signed information.

Figure 3:
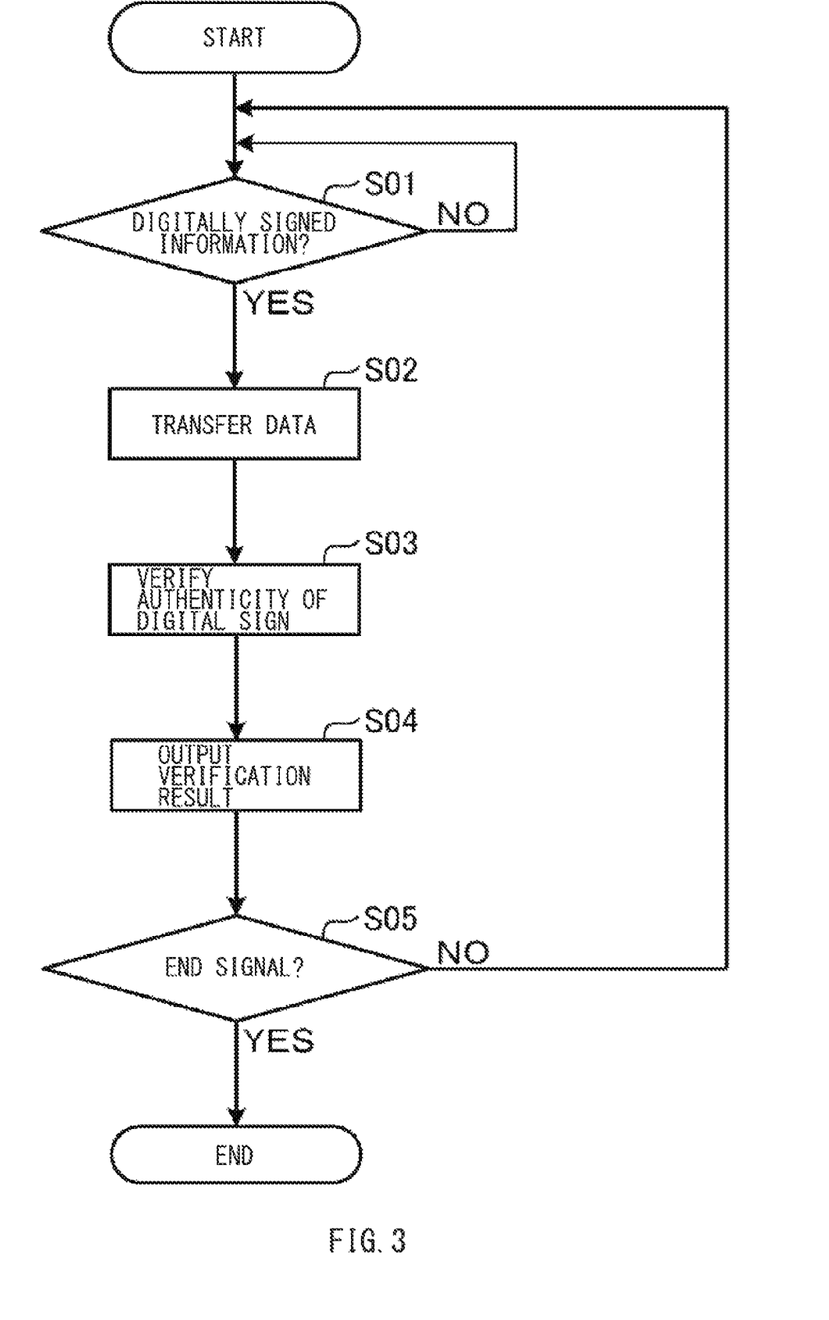
FIG. 3 is a flowchart illustrating an exemplary process performed by a communication control unit in the vehicle communication processor.

FIG. 3 illustrates an outline of an exemplary process performed by the communication control unit 10. After the start of the process, the information receiving section P1 may be brought into a wait state (Step S01: NO). If the information receiving section P1 receives digitally signed information (Step S01: YES), the data transferring section P2 may transfer part (e.g., the data) of the digitally signed information excluding the digital sign to the other ECUs, namely, the control processing units 11 and 12 (Step S02).

Thereafter, the sign verification section P3 of the communication control unit 10 may verify the authenticity of the digital sign of the digitally signed information (Step S03). After the authenticity verification, the sign verification section P3 may send the result of the authenticity verification to the control processing units 11 and 12 to which the data has been transferred (Step S04). If an end signal is inputted (Step S05: YES), the process may end. If the end signal is not inputted (Step S05: NO), the sign verification section P3 may be brought into the wait state again (Step S01: NO).

Figure 4:
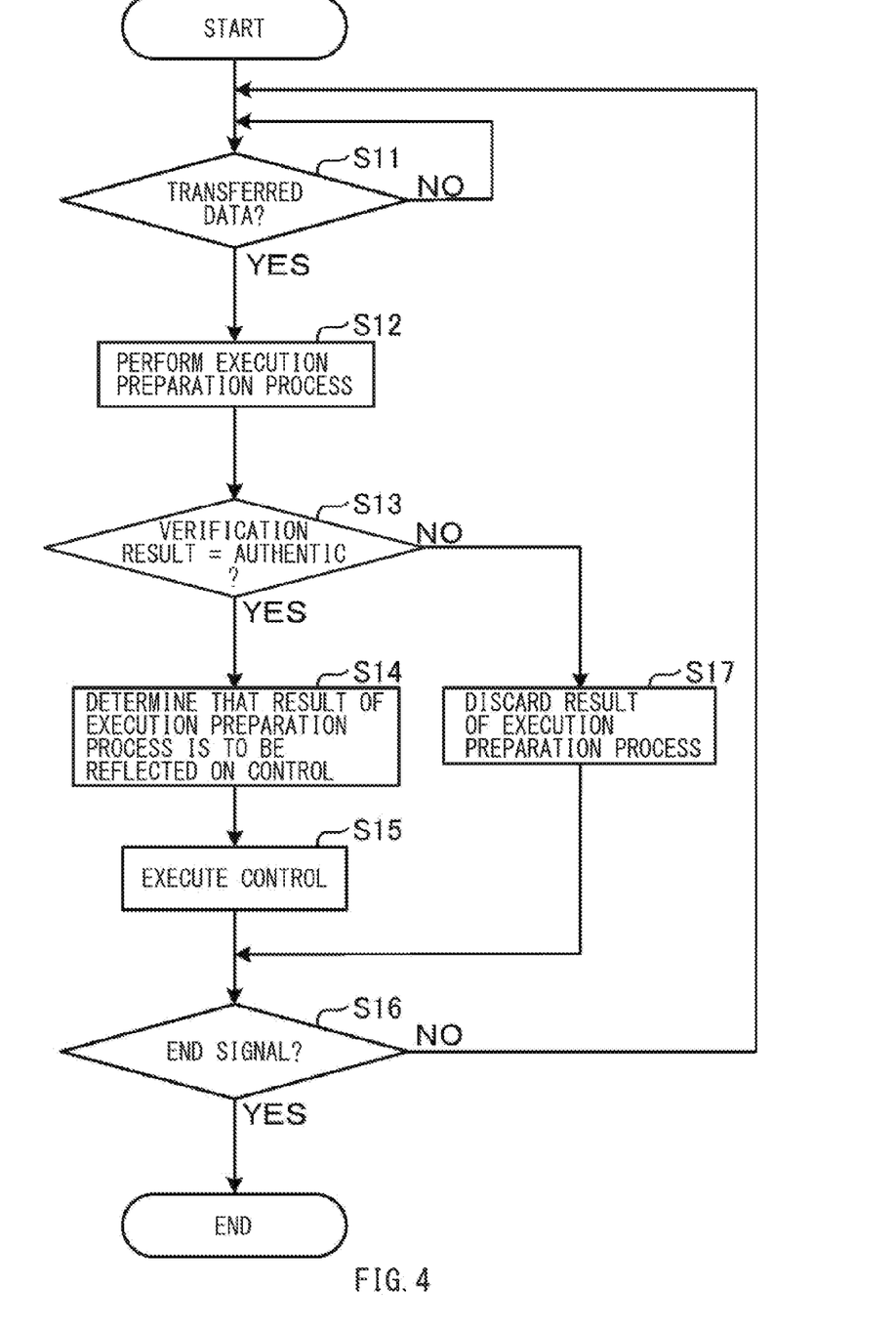
FIG. 4 is a flowchart illustrating an exemplary process performed by a control processing unit in the vehicle communication processor.

FIG. 4 illustrates an outline of an exemplary process performed by the control processing units 11 and 12 to which the data is transferred. If the control processing units 11 and 12 receive the data from the communication control unit 10 (Step S11: YES), the execution preparation section P4 may perform the execution preparation process in which the received data is subjected to the computing process (Step S12). If the result of authenticity verification performed by the sign verification section P3 of the communication control unit 10 indicates that the digital sign is authentic (Step S13: YES), the execution determination section P5 may determine that the result of the computing process performed by the execution preparation section P4 is to be reflected on the control (Step S14). Thereafter, the control processing units 11 and 12 may immediately execute the control on which the result of the computing process performed by the execution preparation section P4 is reflected (Step S15).

In contrast, if the result of the authenticity verification performed by the sign verification section P3 of the communication control unit 10 indicates that the digital sign is not authentic (Step S13: NO), the result of the computing process performed by the execution preparation section P4 may be discarded (Step S17). Thereafter, if the end signal is inputted (Step S16: YES), the process may end. If the end signal is not inputted (Step S16: NO), the sign verification section P3 may be brought into the wait state again (Step S01: NO).

In the process illustrated in FIG. 3 performed by the communication control unit 10, the data of the digitally signed information excluding the digital sign may be unconditionally transferred to the other ECUs, namely, the control processing units 11 and 12. This can force the control processing units and 12 to perform an unnecessary execution preparation process on the data of the digitally signed information even though the digital sign of the digitally signed information is verified as being false. Frequent authenticity verifications of the digital signs as false can increase a processing load on the control processing units 11 and 12.

Figure 5:
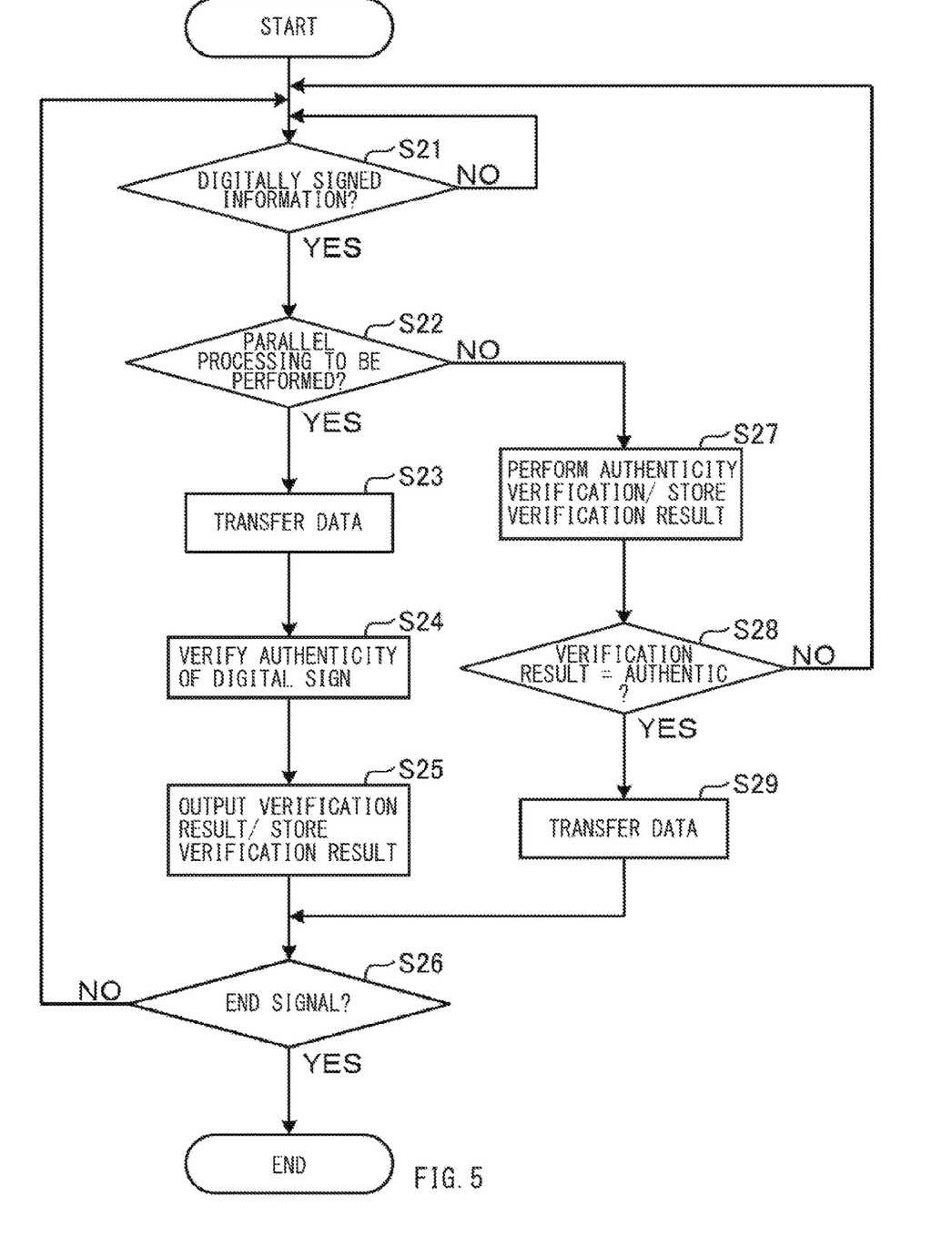
FIG. 5 is a flowchart illustrating another exemplary process performed by the communication control unit.

To address such a concern, in an example illustrated in FIG. 5, the data transferring section P2 of the communication control unit 10 may determine whether the data is to be transferred to the control processing units 11 and 12 so that the control processing units 11 and 12 perform the execution preparation process in parallel to the authenticity verification performed by the sign verification section P3 in the communication control unit 10 (Step S22). The determination may be based on the result of authenticity verification on the digital sign of the digitally signed information previously received.

The process illustrated in FIG. 5 will now be described in detail. If the information receiving section P1 in the wait state (Step S21: NO) receives digitally signed information (Step S21: YES) for the first time, it may be determined that the data is to be transferred to the control processing units 11 and 12 (Step S22: YES), and the data may be transferred to the other ECUs, namely, the control processing units 11 and 12 (Step S23). Thereafter, the authenticity of the digital sign of the digitally signed information may be verified (Step S24), and the result of the authenticity verification may be outputted to the control processing units 11 and 12 to which the data has been transferred. The result of the authenticity verification may be stored in a memory (Step S25). If an end signal is inputted (Step S26: YES), the process may end. If the end signal is not inputted (Step S26: NO), the information receiving section P1 may be brought into the wait state again (Step S21: NO).

If the information receiving section P1 in the wait state receives new digitally signed information (Step S21: YES), it may be determined whether the data of the new digitally singed information is to be transferred to the control processing units 11 and 12 with reference to the result of the previous authenticity verification stored in the memory (Step S22). If the result of the previous authenticity verification indicates that the digital sign is authentic, it may be determined that the data of the new digitally signed information is to be transferred to the control processing units 11 and 12 (Step S22: YES), and the data may be transferred to the control processing unit 11 and 12 as in the previous routine (Step S23). In contrast, if the result of the previous authenticity verification indicates that the digital sign is not authentic, it may be determined that the data of the new digitally singed information is not to be transferred to the control processing units 11 and 12 (Step S22: NO), and the authenticity of the digital sign of the new digitally signed information may be verified without transferring the data. The result of the authenticity verification may be stored in the memory (Step S27).

If the result of authenticity verification obtained in Step S27 indicates that the digital sign is authentic (Step S28: YES), the data of the new digitally signed information excluding the digital sign may be transferred to the control processing units 11 and 12 (Step S29). In contrast, if the result of the authenticity verification obtained in Step S27 indicates that the digital sign is not authentic (Step S28: NO), the data may not be transferred to the control processing units 11 and 12, and the information receiving section P1 may be brought into the wait state again (Step S21: NO).

In a case where multiple pieces of digitally signed information are received and where it is determined that the digital sign in any piece of the digitally signed information is false, the result of the determination in Step S22 may be set to "NO". Thereafter, for example, in a case where the result of the authenticity verification indicating that the digital sign is authentic is obtained n times or more in Step S27, the result of the determination in Step S22 may be returned to "YES". While the determination in Step S22 is set to "NO", the authenticity verification of the digital sign by the communication control unit 10 and the execution preparation process by the control processing units 11 and 12 may not be performed in parallel to each other.

Note that the determination process in Step S22 described above is a non-limiting example. The determination process described above reduces unnecessary execution preparation process performed by the control processing units 11 and 12 on the transferred data of the digitally signed information whose digital sign is verified as being false, and thus reduces the load on the control processing units 11 and 12.

Figure 6:
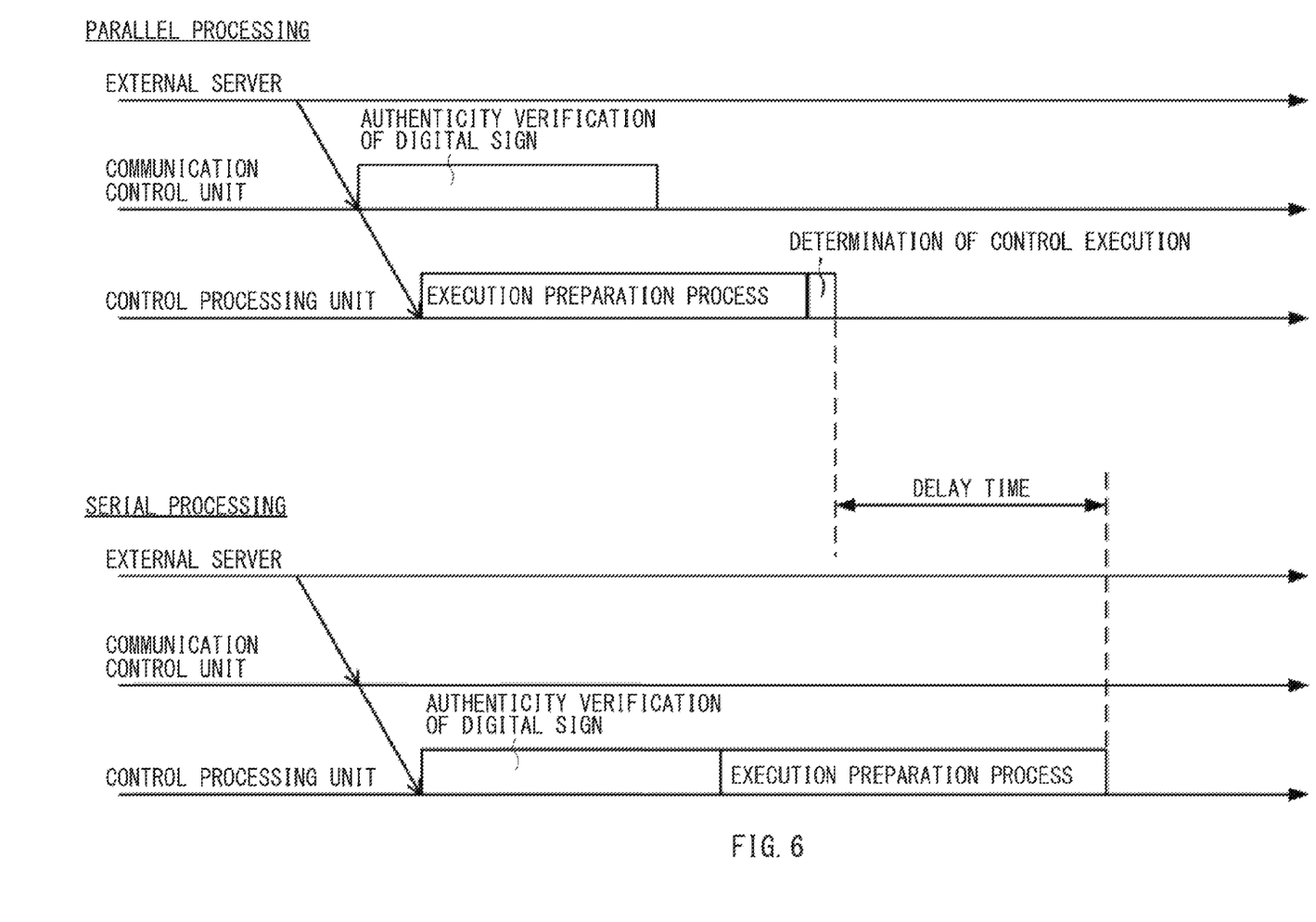
FIG. 6 is a time chart of the process performed by the vehicle communication processor.

FIG. 6 is a time chart of the authenticity verification performed by the communication control unit 10 and the execution preparation process performed by the control processing units 11 and 12 after the communication control unit 10 receives the digitally signed information from the external server. FIG. 6 illustrates two cases in comparison. In one case illustrated in an upper part of FIG. 6, the authenticity verification and the execution preparation process are performed in parallel (i.e., parallel processing may be performed) after the digitally signed information is received by the communication control unit 10, as described above. In the other case illustrated in a lower part of FIG. 6, the execution preparation process is performed after the authenticity verification (i.e., serial processing may be performed). As apparent from FIG. 6, a delay in control execution is suppressed in the parallel processing in which the authenticity verification and the execution preparation process are respectively performed by the communication control unit 10 and the control processing units 11 and 12 in a parallel manner, compared with the serial processing in which the authenticity verification and the execution preparation process are performed by a single ECU in a serial manner, in spite of the presence of the processing time for determining the control execution in the parallel processing.

In the example embodiments described above, the communication control unit 10 having a communication function may include the sign verification section P3, and the other ECUs, namely, the control processing units 11 and 12 may include the execution preparation section P4. However, this is a non-limiting example and these ECUs may share the functions in a different manner. For example, as illustrated in FIG. 7, one of the ECUs coupled in parallel to the communication control unit 10 (e.g., the control processing unit 11) may include the sign verification section P3 that performs the authenticity verification of the digital sign, and the other ECU coupled in parallel to the communication control unit 10 (e.g., the control processing unit 12) may include the execution preparation section P4 that performs the execution preparation process and the execution determination section P5 that determines the execution of the control.

Figure 7:
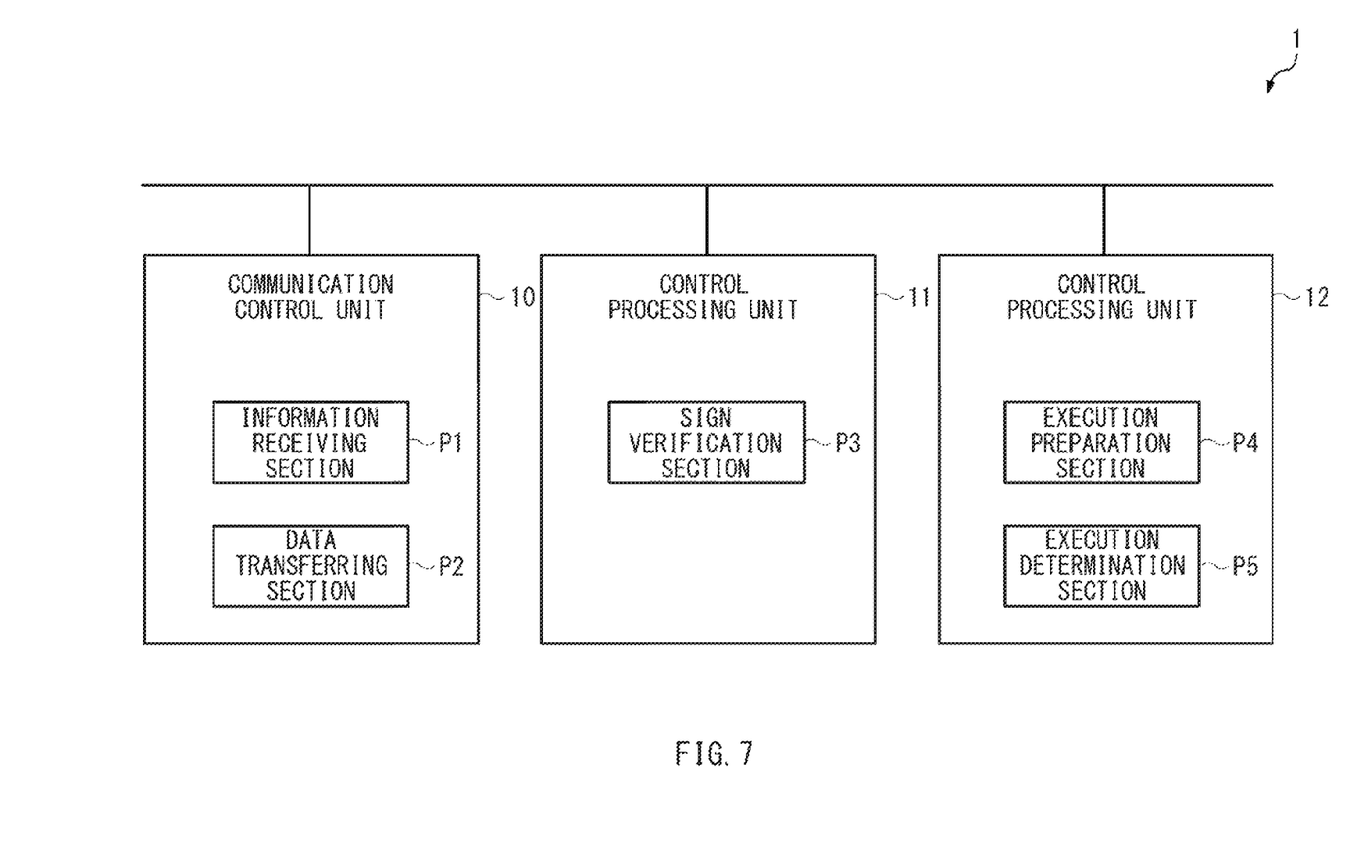
FIG. 7 is a block diagram illustrating another exemplary configuration of the vehicle communication processor.

In the example illustrated in FIG. 7, when the information receiving section P1 in the communication control unit 10 receives digitally signed information, the data transferring section P2 may transfer the digital sign of the digitally signed information to the control processing unit 11, and transfer the data of the digitally signed information excluding the digital sign to the control processing unit 12. Accordingly, the authenticity verification of the digital sign and the execution preparation process are respectively performed by the control processing unit 11 and the control processing unit 12 in a parallel manner.

According to the vehicle communication processor 1 and the method of controlling the vehicle communication control based on the control processing executed by the vehicle communication processor 1 of the example embodiments of the technology described above, it is possible to achieve the vehicle communication control that involves receiving digitally signed information while suppressing generation of a delay time caused by the authentic verification of the digital sign of the digitally signed information. Further, it is possible to ensure the safety in the vehicle communication control that involves receiving digitally signed information by suppressing the communication delay.

Some example embodiments of the technology are described in detail above with reference to the accompanying drawings. It should be appreciated that the example embodiments of the technology described above are mere examples and are not intended to limit the scope of the technology. It should be also appreciated that various omissions, replacements, and modifications may be made in the foregoing example embodiments described herein, without departing from the scope of the technology. The technology is intended to include such modifications and alterations in so far as they fall within the scope of the appended claims or the equivalents thereof.

One or more of the communication control unit 10, the control processing units 11 and 12, the sign verification section P3, the execution preparation section P4, and the execution determination section P5 in the vehicle communication processor 1 illustrated in FIG. 2 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the communication control unit 10, the control processing units 11 and 12, the sign verification section P3, the execution preparation section P4, and the execution determination section P5. Such a medium may take many forms, including, but not limited to, any type of magnetic medium such as a hard disk, any type of optical medium such as a CD and a DVD, any type of semiconductor memory (i.e., semiconductor circuit) such as a volatile memory and a nonvolatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the communication control unit 10, the control processing units 11 and 12, the sign verification section P3, the execution preparation section P4, and the execution determination section P5 in the vehicle communication processor 1 illustrated in FIG. 2.

The invention claimed is:

1. A vehicle communication processor comprising:
a first electronic control unit (ECU) configured to receive digitally signed information from an external device disposed outside of a vehicle, the digitally signed information including data and a digital sign; and
a second ECU and a third ECU different from the second ECU, the second ECU and the third ECU being configured to process information received from the first ECU, wherein:
the first ECU is configured to transfer the data of the digitally signed information without transferring the digital sign, to the second ECU,
the first ECU or the third ECU is configured to perform an authenticity verification on the digital sign, and
the second ECU is configured to:
perform an execution preparation process on the data for executing a process based on the data in parallel to the authenticity verification performed by the first ECU or the third ECU on the digital sign, and
determine that the process based on the data is to be executed in a case where the digital sign is verified as being authentic by the authenticity verification of the first ECU or the third ECU.

2. The vehicle communication processor according to claim 1, wherein
the second ECU and the third ECU are coupled in parallel to the first ECU via a gateway.

3. The vehicle communication processor according to claim 1, wherein
at least one of the second ECU or the third ECU is configured to perform travel assistance control.

4. The vehicle communication processor according to claim 2, wherein
at least one of the second ECU or the third ECU is configured to perform travel assistance control.

5. A vehicle comprising the vehicle communication processor according to claim 1.

6. A vehicle comprising the vehicle communication processor according to claim 2.

7. A vehicle comprising the vehicle communication processor according to claim 3.

8. A vehicle comprising the vehicle communication processor according to claim 4.

9. A vehicle communication control method comprising:
receiving, by a first electronic control unit (ECU), digitally signed information from an external device disposed outside of a vehicle, the digitally signed information including data and a digital sign;
transferring the data from the first ECU to a second ECU without transferring the digital sign;
performing an authenticity verification, by the first ECU or a third ECU different from the second ECU, the third ECU being configured to process information received by the first ECU, on the digital sign;
performing, by the second ECU, an execution preparation process on the data for executing a process based on the data in parallel to the authenticity verification performed by the first ECU or the third ECU on the digital sign; and
determining that the process based on the data is to be executed in a case where the digital sign is verified as being authentic by the first ECU or the third ECU, and discarding the data in a case where the digital sign is not verified as being authentic by the first ECU or the third ECU.

10. A vehicle communication processor comprising:
first circuitry including a first electronic control unit (ECU), the first ECU being configured to receive digitally signed information from an external device disposed outside of a vehicle, the digitally signed information including data and a digital sign; and
second circuitry including a second ECU and a third ECU, the second circuitry being configured to process information received from the first circuitry, wherein:
the first ECU is configured to transfer the data to the second ECU without transferring the digital sign,
the first ECU or the third ECU is configured to perform an authenticity verification on the digital sign, and
the second ECU is configured to:
perform an execution preparation process on the data for executing a process based on the data in parallel to the authenticity verification performed by the first ECU or the third ECU on the digital sign, and
determine that the process based on the data is to be executed in a case where the digital sign is verified as being authentic by the authenticity verification of the first ECU or the third ECU.

* * * * *